(12) United States Patent
Villeneuve et al.

(10) Patent No.: US 10,473,026 B2
(45) Date of Patent: Nov. 12, 2019

(54) METHOD OF MANUFACTURING A ROTARY ENGINE CASING

(71) Applicant: PRATT & WHITNEY CANADA CORP., Longueuil (CA)

(72) Inventors: Bruno Villeneuve, Boucherville (CA); Jean-Gabriel Gauvreau, Brossard (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 0 days.

(21) Appl. No.: 16/100,666

(22) Filed: Aug. 10, 2018

(65) Prior Publication Data

US 2018/0347457 A1    Dec. 6, 2018

Related U.S. Application Data

(62) Division of application No. 14/974,489, filed on Dec. 18, 2015, now Pat. No. 10,072,566.

(51) Int. Cl.
| | |
|---|---|
| *F03C 2/00* | (2006.01) |
| *F03C 4/00* | (2006.01) |
| *F04C 2/00* | (2006.01) |
| *F02B 55/10* | (2006.01) |
| *F02B 53/04* | (2006.01) |
| *F02B 53/10* | (2006.01) |
| *F02B 55/08* | (2006.01) |

(Continued)

(52) U.S. Cl.
CPC .............. *F02B 55/10* (2013.01); *F01C 1/22* (2013.01); *F01C 11/002* (2013.01); *F01C 19/12* (2013.01); *F01C 21/06* (2013.01); *F01C 21/10* (2013.01); *F01C 21/108* (2013.01); *F02B 53/04* (2013.01); *F02B 53/10* (2013.01); *F02B 55/08* (2013.01); *F02B 55/14* (2013.01); *F01C 20/02* (2013.01); *F02B 2053/005* (2013.01); *Y02T 10/17* (2013.01)

(58) Field of Classification Search
CPC .......... F01C 19/04; F01C 19/08; F01C 19/10; F01C 19/12; F04C 15/003; F04C 15/0023; F02B 2053/005; F02B 53/10; F02B 53/04; F02B 55/08; F02B 55/10; F02B 55/14
USPC .... 418/1, 61.2, 101, 113, 140, 142; 123/200
See application file for complete search history.

(56) References Cited

U.S. PATENT DOCUMENTS

| | | |
|---|---|---|
| 3,791,235 A | 2/1974 | Woodier et al. |
| 3,849,035 A | 11/1974 | Jones |

(Continued)

FOREIGN PATENT DOCUMENTS

| | | |
|---|---|---|
| AU | 2017101231 A4 | 10/2017 |
| AU | 2017101231 B4 | 10/2017 |

(Continued)

*Primary Examiner* — Theresa Trieu
(74) *Attorney, Agent, or Firm* — Norton Rose Fulbright Canada LLP (57) ABSTRACT

A rotary engine casing having at least one end wall of an internal cavity for a rotor including a seal-engaging plate sealingly engaging the peripheral wall to partially seal the internal cavity and a member mounted adjacent the seal-engaging plate outside of the internal cavity. The member and seal-engaging plate having abutting mating surfaces which cooperate to define between them at least one fluid cavity communicating with a source of liquid coolant. When the casing includes a plurality of rotor housings, the end wall may be between rotor housings. A method of manufacturing a rotary engine casing is also discussed.

6 Claims, 5 Drawing Sheets

(51) Int. Cl.
*F02B 55/14* (2006.01)
*F01C 1/22* (2006.01)
*F01C 11/00* (2006.01)
*F01C 19/12* (2006.01)
*F01C 21/10* (2006.01)
*F01C 21/06* (2006.01)
*F02B 53/00* (2006.01)
*F01C 20/02* (2006.01)

(56) References Cited

U.S. PATENT DOCUMENTS

| | | |
|---|---|---|
| 3,941,526 A | 3/1976 | Kutkus |
| 3,942,917 A | 3/1976 | Wieland |
| 3,947,160 A | 3/1976 | Black et al. |
| 4,315,719 A | 2/1982 | Sakamaki et al. |
| 5,295,814 A | 3/1994 | Uebel |
| 5,352,295 A | 10/1994 | Chou |
| RE34,876 E | 3/1995 | Adiwinata |
| 6,022,204 A | 2/2000 | Murayama et al. |
| 6,796,285 B2 | 9/2004 | Karnes |
| 2012/0240885 A1 | 9/2012 | Horn |

FOREIGN PATENT DOCUMENTS

| | | |
|---|---|---|
| GB | 926801 | 5/1963 |
| JP | S6296736 | 5/1987 |

FIG. 1

METHOD OF MANUFACTURING A ROTARY ENGINE CASING

CROSS-REFERENCE TO RELATED APPLICATIONS

The present application is a divisional of U.S. application Ser. No. 14/974,489 filed Dec. 18, 2015 the content of this application being incorporated herein by reference.

TECHNICAL FIELD

The application relates generally to rotary engines, and more particularly, to engine casings for such engines.

BACKGROUND OF THE ART

In certain rotary engines, liquid cooling is provided in the side or end casings, and when multiple rotors are present, in the intermediate casing(s). In these engine casings, fluid cavities are provided to cool the rotor housings. However, the manufacturing of such engine casings can be complex and limited to specific manufacturing methods, such as casting. Moreover, since the casings have surfaces in sliding contact with the rotating rotors, wear and damage is inevitable. Yet, because of the cooling passages these can be expensive components to replace.

SUMMARY

In one aspect, there is provided a rotary engine casing comprising first and second axially spaced apart end walls interconnected by a peripheral wall, the first end wall, second end wall and peripheral wall together enclosing an internal cavity configured to sealingly engage a rotor rotatable therein, at least the first end wall including a seal-engaging plate sealingly engaging the peripheral wall to partially seal the internal cavity and a member mounted adjacent the seal-engaging plate outside of the internal cavity, the member and seal-engaging plate having abutting mating surfaces, the mating surfaces cooperating to define between them at least one fluid cavity communicating with a source of liquid coolant, the at least one fluid cavity configured to in use cool the rotor.

In another aspect, there is provided a rotary engine casing comprising: a plurality of axially spaced end walls; two end-casing sections located at opposite ends of the rotary engine casing and each including a respective one of the end walls; and a central-casing section mounted between the two end-casing sections, the central-casing section comprising: a plurality of rotor housings each including a peripheral wall of a respective internal cavity for receiving a respective rotor, each peripheral wall cooperating with two of the end walls to enclose the respective internal cavity; and an intermediate section mounted between each adjacent ones of the rotor housings, each intermediate section including a first seal-engaging plate sealingly engaging the peripheral wall of a first of the adjacent ones of the rotor housings to partially seal the internal cavity thereof, a second seal-engaging plate sealingly engaging the peripheral wall of a second of the adjacent ones of the rotor housings to partially seal the internal cavity thereof, and a member mounted between the first and second seal-engaging plates, the member and first seal-engaging plate having abutting first mating surfaces cooperating to define between them at least one first fluid cavity communicating with a source of liquid coolant, the member and second seal-engaging plate having abutting second mating surfaces the mating surfaces cooperating to define between them at least one second fluid cavity communicating with the source of liquid coolant.

In a further aspect, there is provided a method of manufacturing a rotary engine casing, the method comprising: manufacturing two end-casing sections including a first part of a fluid path for circulating a cooling fluid; manufacturing a central-casing section defining at least one internal cavity for receiving a rotor and a second part of the fluid path; wherein at least one of the manufacturing of the two end-casing sections and of the manufacturing of the central-casing section includes: manufacturing a member having a first mating surface, manufacturing a seal-engaging plate having a second mating surface, and machining at least one surface depression on at least one of the first and second mating surfaces, the at least one surface depression in fluid communication with the fluid path; and assembling the central-casing section between the two end-casing sections, including connecting the first and second parts of the fluid path, and assembling the member with the seal-engaging plate by abutting the first and second mating surfaces such that the at least one surface depression defines a fluid cavity in communication with the fluid path for circulating a cooling fluid therein.

DESCRIPTION OF THE DRAWINGS

Reference is now made to the accompanying figures in which.

DETAILED DESCRIPTION

Figure 1:
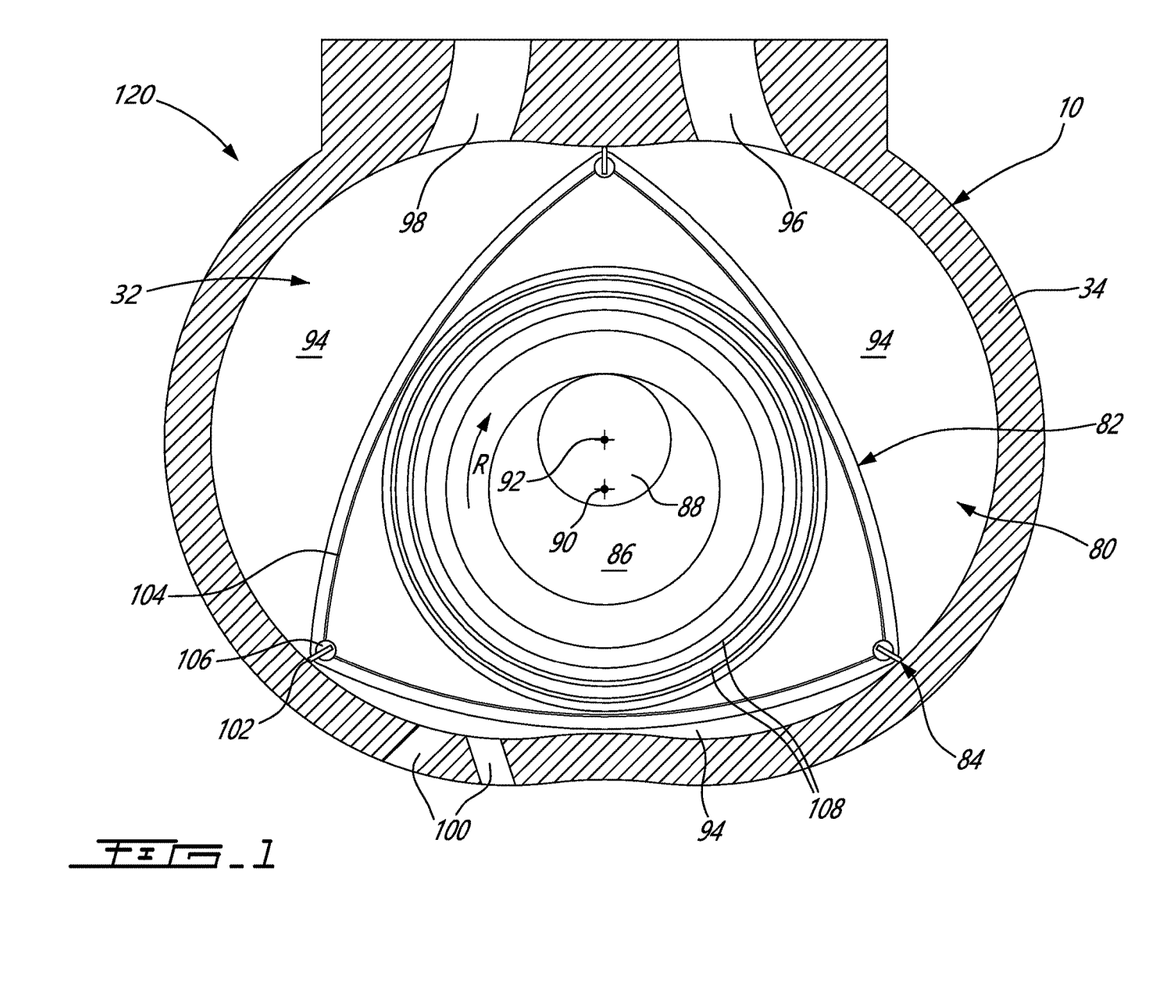
FIG. 1 is a schematic cross-sectional view of a rotary internal combustion engine in accordance with a particular embodiment.

Referring to FIG. 1, a rotary engine 120 according to a particular embodiment is shown. The rotary engine is a Wankel engine and comprises a casing 10 having at least one internal cavity 32 (only one being visible in FIG. 1), each internal cavity 32 being defined by two axially spaced apart end walls 80 interconnected by a peripheral wall 34. Each internal cavity 32 has a profile defining two lobes, which is preferably an epitrochoid. A rotor 82 is received within each internal cavity 32. The rotor defines three circumferentially-spaced apex portions 84, and a generally triangular profile with outwardly arched sides. The apex portions 84 are in sealing engagement with the inner surface of the peripheral wall 34 of the casing 10 to form three working chambers 94 between the rotor 82 and the casing 10.

The rotor 82 is engaged to an eccentric portion 86 of a shaft 88 to perform orbital revolutions within the internal cavity 32. The shaft 88 performs three rotations for each orbital revolution of the rotor 82. The geometrical axis 90 of the rotor 82 is offset from and parallel to the axis 92 of the casing 10. During each orbital revolution, each chamber 94 varies in volume and moves around the internal cavity 32 to undergo the four phases of intake, compression, expansion and exhaust.

An intake port 96 is provided through the peripheral wall 34 for successively admitting compressed air into each working chamber 94. An exhaust port 98 is also provided through the peripheral wall 34 for successively discharging the exhaust gases from each working chamber 94. Passages 100 for a glow plug, spark plug or other ignition element, as well the fuel injectors are also provided through the peripheral wall 34. Alternately, the intake port 96, the exhaust port 98 and/or the passages 100 may be provided through one of the end walls 80 of the casing 10; and/or, the ignition element and a pilot fuel injector may communicate with a pilot subchamber (not shown) defined in the rotor casing 10 and communicating with the internal cavity 32 for providing a pilot injection. The pilot subchamber may be for example defined in an insert (not shown) received in the peripheral wall 34.

In a particular embodiment, the fuel injectors are common rail fuel injectors, and communicate with a source of heavy fuel (e.g. diesel, kerosene (jet fuel), equivalent biofuel), and deliver the heavy fuel into the engine(s) such that the combustion chamber is stratified with a rich fuel-air mixture near the ignition source and a leaner mixture elsewhere.

For efficient operation the working chambers 94 are sealed, for example by spring-loaded apex seals 102 extending from the rotor 82 to engage the peripheral wall 34, and spring-loaded face or gas seals 104 and end or corner seals 106 extending from the rotor 82 to engage the end walls 80. The rotor 82 also includes at least one spring-loaded oil seal ring 108 biased against the end wall 80 around the bearing for the rotor 82 on the shaft eccentric portion 86. Alternately, the oil seal ring(s) may be provided in the end walls 80 to engage the rotor 82.

In a particular embodiment which may be particularly but not exclusively suitable for low altitude, each Wankel engine has a volumetric expansion ratio of from 5 to 9, and operates following the Miller cycle, with a volumetric compression ratio lower than the volumetric expansion ratio, for example by having the intake port located closer to the top dead center (TDC) than an engine where the volumetric compression and expansion ratios are equal or similar. Alternately, each Wankel engine may operate with similar or equal volumetric compression and expansion ratios.

It is understood that other configurations are possible for the engine 120. The configuration of the engine 120, e.g. placement of ports, number and placement of seals, number of fuel injectors, etc., may vary from that of the embodiment shown.

Figure 2:
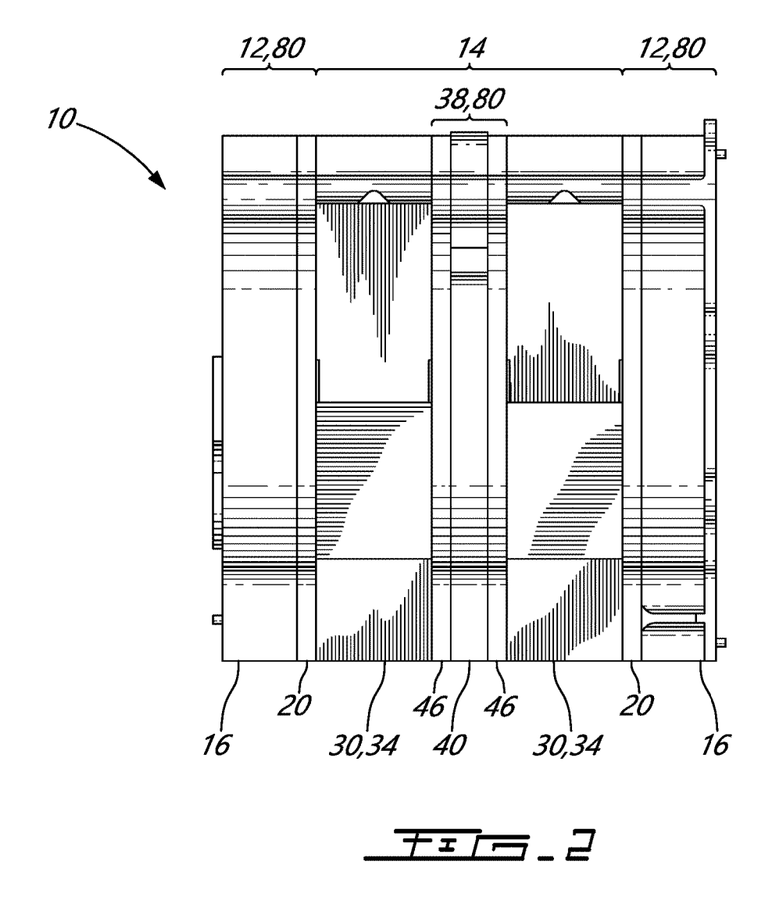
FIG. 2 is a schematic side view of a rotor engine casing in accordance with a particular embodiment.

Referring to FIG. 2, in a particular embodiment the rotary engine casing 10 defines two axially spaced internal cavities each receiving one of two rotors engaged to a common shaft. The engine casing 10 includes multiple assembled casing sections which cooperate to define the internal cavities and contain the rotors and shaft, and include bearing-support features, and cooling and lubrication passages, as detailed further below.

In the particular embodiment shown in FIG. 2, the engine casing 10 includes two end-casing sections 12, located at opposite ends of the engine casing 10, and each defining an end wall 80 of a respective one of the internal cavities 32, and a central-casing section 14 mounted between the two end-casing sections 12. The central-casing section 14 includes two rotor housings 30 each defining the peripheral wall 34 of a respective internal cavity 32, and an intermediate section 38 defining the end wall 80 extending between both internal cavities 32 to separates and seal the internal cavities 32. Each end-casing section 12 is split to allow separation of the end-casing section 12 into two sub-parts 16, 20 and the intermediate section 38 is split into three sub-parts 40, 46. Advantageously, the sub-parts can be machined, dowelled and/or bolted together and kept as a semi-permanent sub-assembly to ease in the process of engine assembly. Although the casing 10 is described herein with the two end-casing sections 12 and the intermediate section 38 (i.e. all end walls 80) having a split configuration, it is understood that in an alternate embodiment, only one or two of the end-casing sections 12 and intermediate section 38 may have a split configuration.

The central-casing section 14 shown in FIG. 2 has two rotor housings 30 separated by one intermediate section 38, to receive two rotors. In an alternate embodiment, the engine 120 can have any other adequate number of rotors and accordingly the central-casing section 14 can have a corresponding number of rotor housings 30. If only one rotor housing 30 is provided, the intermediate section 38 is omitted and, if multiple rotor housings 30 are provided, each pair of rotor housings 30 is separated by an intermediate section 38.

Figure 3:
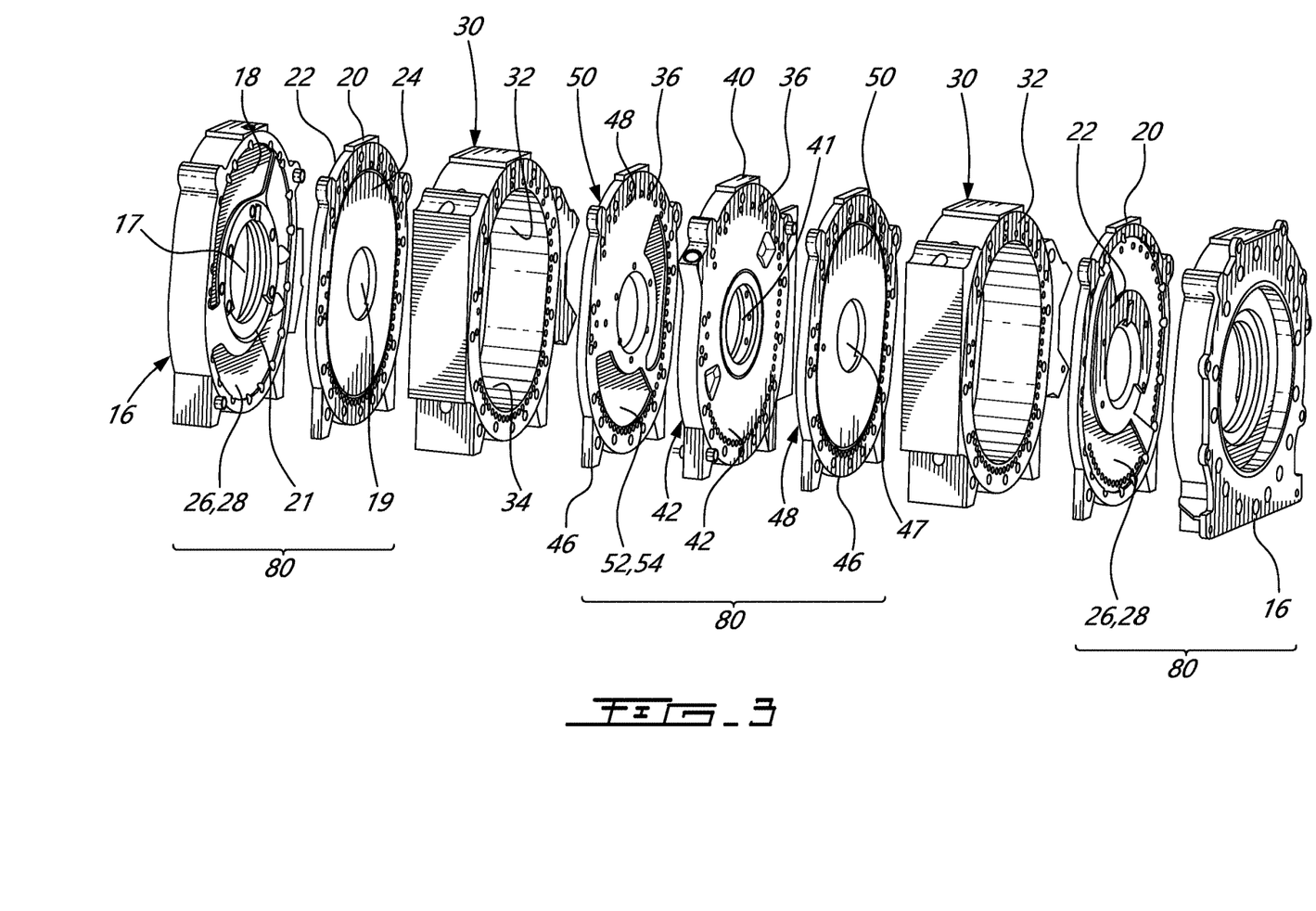
FIG. 3 is an exploded tridimensional view of the engine casing shown in FIG. 2.

Referring to FIG. 3, each end-casing section 12 includes two-sub parts 16, 20, the first sub-part being provided in the form of a member configured as an end-casing member 16 and having a mating surface 18. The end-casing member 16 is an end portion delimiting the axial boundary of the engine casing 10.

The second sub-part of each end-casing section 12 can take the form of a seal-engaging plate 20 connected to the end-casing member 16. The seal-engaging plate 20 has a mating surface 22 abutted to the mating surface 18 of the end-casing member 16, and a sliding surface 24, which in a particular embodiment is a hardened surface, facing away from the end-casing member 16 and defining a surface of the respective internal cavity 32. The seal-engaging plate 20 sealingly engages the peripheral wall 34 defined by the adjacent rotor housing 30 to partially seal the corresponding internal cavity. In use, the face seals 104 of the rotor 82 (see FIG. 1) thus engage the sliding surfaces 24. The sliding surfaces 24 can have any surface finish suitable for sealing engagement with the face seals 104.

Each end-casing member 16 has an aperture 17 defined therethrough to receive a bearing housing (not shown) supporting the engine shaft 88 (FIG. 1). Similarly, each seal-engaging plate 20 has an aperture 19 defined therethrough concentrically with the aperture of the associated end-casing member 16, sized to receive the engine shaft 88 therethrough.

Figure 5:
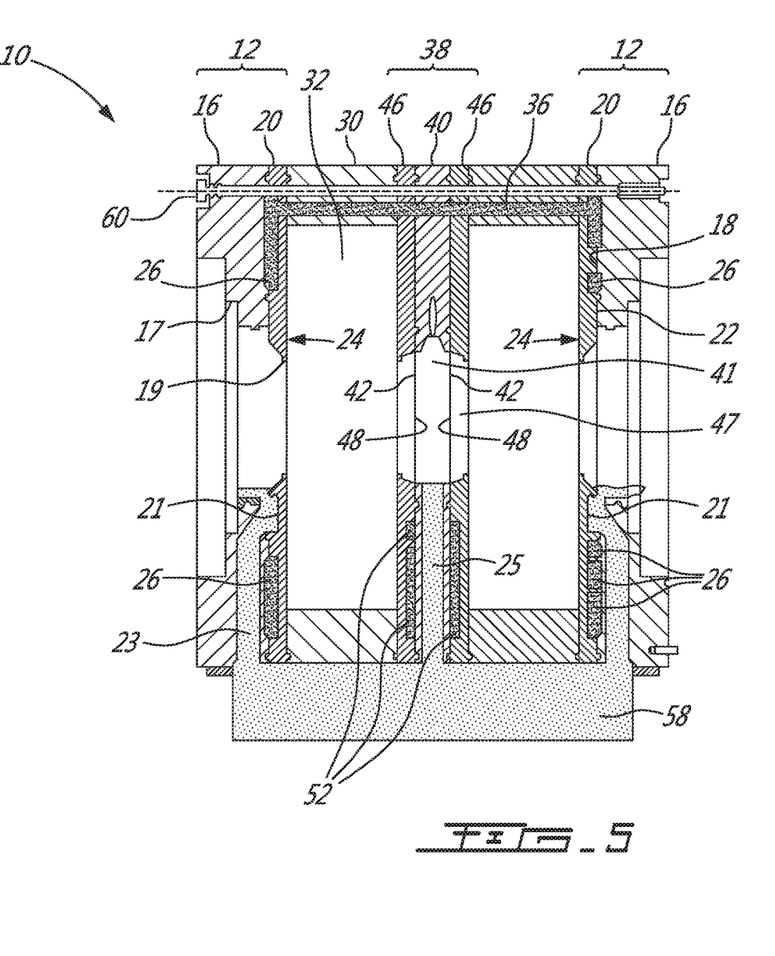
FIG. 5 is a schematic cross-sectional view of the engine casing shown in FIG. 2.

As can be best seen in FIG. 5, the end-casing member 16 also include oil scavenge cavities 21 defined in the mating surface 18 around the aperture, and oil circulation passages 23 in fluid communication with the scavenge cavities and with an oil reservoir 58 forming part of an oil path providing oil or other lubricating fluid circulation through the engine 120, including the central-section 14.

Still referring to FIG. 5, each end-casing section 12 also includes at least one fluid cavity 26 in fluid communication with a source of liquid coolant (e.g. water) through a cooling fluid path of the engine casing 10, for cooling the end-casing section 12. The cooling fluid path includes an inlet and an outlet which may be defined in one of the end-casing sections 12, and is in fluid communication with an appropriate cooler (not shown).

Figure 4:
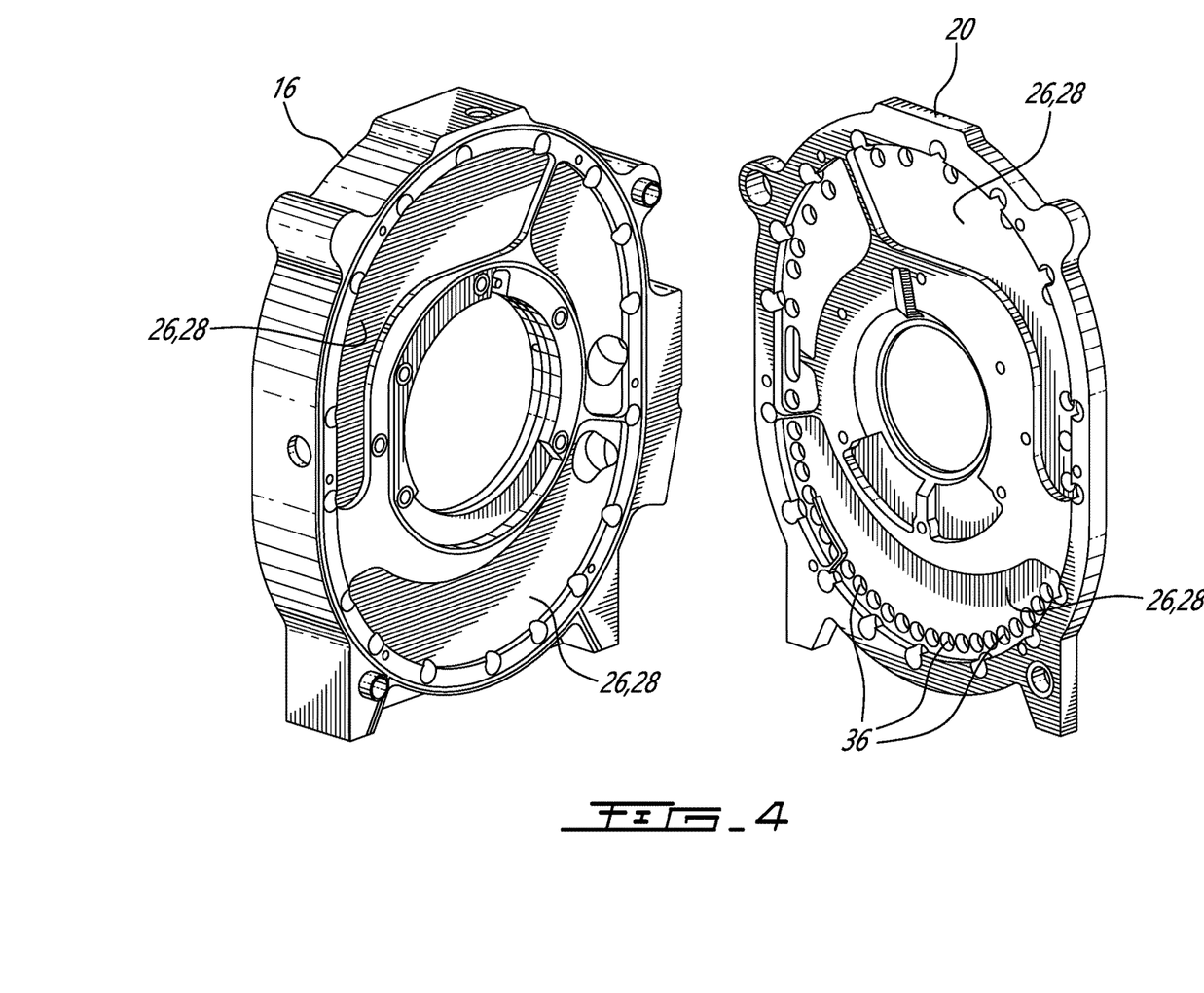
FIG. 4 is a schematic tridimensional view of a member and a seal-engaging plate of the engine casing of FIG. 2.

Each end-casing fluid cavity 26 is located between the mating surfaces 18, 22 and is defined by surface depression(s) 28 formed on one or both of the mating surfaces 18, 22. In the particular embodiment shown in FIGS. 3-5, the end-casing fluid cavity 26 includes multiple cooperating surface depressions 28 formed on the mating surfaces 18, 22. The surface depressions 28 are sized and positioned to allow adequate cooling of the engine casing 10. As can be best seen in FIG. 4, complementary surface depressions 28 are defined in each of the mating surfaces 18, 22 and cooperate to form the end-casing fluid cavities 26. The end-casing fluid cavity 26 can have any configuration suitable for circulating a cooling fluid therein. In the particular embodiment shown, the fluid path includes a plurality of apertures 36 defined across the engine casing 10, including the seal-engaging plate 20 and central-casing section 14, in fluid communication with the fluid cavities 26, such that the cooling fluid can circulate within the cavities 26 and through the various sections of the engine casing 10. In the embodiment shown, the apertures 36 extend axially across seal-engaging plate 20 and central-casing section 14, from the fluid cavities 26 of one of the end-casing sections 12 to the fluid cavities 26 of the other of the end-casing sections 12. It is understood that any other adequate type of fluid communication may alternately be used.

In an alternate embodiment which is not shown, the surface depression(s) 28 of the end-casing fluid cavity 26 is/are located only on the mating surface 18 of the end-casing member 16. In that case, the mating surface 22 of the seal-engaging plate 20 does not include surface depressions. In another alternate embodiment which is not shown, the surface depression(s) 28 of the end-casing fluid cavity 26 is/are located on the mating surface 22 of the seal-engaging plate 20. In that case, the mating surface 18 does not include surface depressions. It is also understood that any combination of fluid cavities defined by depressions in only one of the mating surfaces 18, 22 and defined by depression in both of the mating surfaces 18, 22 can be used.

In the embodiment shown, and as can be seen more clearly in FIG. 5, the two end-casing sections 12 have different configurations and each end-casing sections 12 has a different number of end-casing fluid cavities 26. Alternately, the two end-casing sections 12 may have similar fluid cavities 26.

The end-casing member 16 has a thickness greater than a thickness of the seal-engaging plate 20. In a particular embodiment, the seal-engaging plate 20 has a thickness of 0.25 times that of the end-casing member 16; other relative dimensions may alternately be used.

Referring back to FIG. 3, the central-casing section 14 of the particular embodiment shown includes two rotor housing 30 each defining a respective internal cavity 32 for receiving a respective rotor 82 (shown in FIG. 1). Each adjacent ones of the rotor housings 30 are separated by an intermediate section 38. The intermediate section 38 has similar functionalities as the end-casing section 12 described above and separates adjacent rotor housings 30 in multi-rotor engines.

The intermediate section 38 includes a member configured as an intermediate member 40 which has opposite, parallel first and second mating surfaces 42. The intermediate section 38 also includes a pair of intermediate seal-engaging plates 46 (i.e. first and second seal-engaging plates 46) connected to the intermediate member 40. Each intermediate seal-engaging plate 46 has a mating surface 48 abutted to a respective one of the mating surfaces 42 of the intermediate member 40 and, a sliding surface 50, which in a particular embodiment is a hardened sliding surface, facing away from the intermediate member 40 and defining a surface of the respective internal cavity 32. The seal-engaging plates 46 each sealingly engage the peripheral wall 34 defined by the adjacent rotor housing 30 to partially seal the corresponding internal cavity.

The intermediate section 38 includes an intermediate member 40 which has opposite, parallel mating surfaces 42. The intermediate section 38 also includes a pair of intermediate seal-engaging plates 46 connected to the intermediate member 40. Each intermediate seal-engaging plate 46 has a mating surface 48 abutted to a respective one of the mating surfaces 42 of the intermediate member 40 and, a sliding surface 50, which in a particular embodiment is a hardened sliding surface, facing away from the intermediate member 40 and defining a surface of the respective internal cavity 32. The seal-engaging plates 46 each sealingly engage the peripheral wall 34 defined by the adjacent rotor housing 30 to partially seal the corresponding internal cavity.

As can also be seen in FIG. 5, the intermediate member 40 has an aperture 41 defined therethrough concentrically with the apertures 17, 19 of the end-casing sections 12 to the engine shaft 88 therethrough; although not shown, the aperture 41 could also be sized to receive a bearing housing, particularly but not exclusively for engines including more than two rotors. Similarly, each seal-engaging plate 46 has an aperture 47 defined therethrough concentrically with the aperture of the intermediate member 40, sized to also receive the engine shaft 88 therethrough. The intermediate member 40 includes an oil scavenge passage 25 communicating with the aperture 41 and with the oil reservoir 58.

The intermediate section 38 also includes at least one intermediate fluid cavity 52 in fluid communication with the fluid path of the engine casing 10, for cooling the rotor housing 30. Each intermediate fluid cavity 52 is located between the intermediate member 40 and the intermediate seal-engaging plates 46. Each intermediate fluid cavity 52 is defined by a surface depression 54 formed on the mating surface 48 of the respective seal-engaging plate 46, while the mating surfaces 42 of the intermediate member 40 are free of depressions.

In an alternate embodiment which is not shown, one or more of the intermediate fluid cavities 52 may be defined by depressions in the mating surface 42 of the intermediate member 40, alone or in combination with a complementary depression in the mating surface 48 of the corresponding seal-engaging plate 46. It is also understood that any combination of fluid cavities defined by depressions in only one of the abutting mating surfaces 42, 48 and defined by depression in both of the abutting mating surfaces 42, 48 can be used.

The intermediate fluid cavity 52 can have any configuration suitable for circulating a cooling fluid therein. In the particular embodiment shown, the apertures 36 of the fluid path defined across the engine casing 10 extend through the seal-engaging plates 46 and the intermediate member 40, in fluid communication with the intermediate fluid cavities 52 to connect the fluid cavities 52 to the fluid path. It is understood that any other adequate type of fluid communication may alternately be used.

In the illustrated embodiment, the intermediate fluid cavities 52 are shaped differently from the end-casing fluid cavities 26, and are positioned along different circumferential portions of the engine 120. The shape and position of the fluid cavities can be optimized based on engine operating conditions and/or configuration. In the embodiment shown, the intermediate fluid cavities 52 are concentrated along the circumferential portion of the rotor housing 30 where combustion occurs.

In the embodiment shown, and as can be seen more clearly in FIG. 5, the two seal-engaging plates 46 have different configurations and different intermediate fluid cavities 52 are defined on each side of the intermediate member 40. Alternately, the two sides of the intermediate member 40 may have similar fluid cavities 52.

The intermediate member 40 has a thickness greater than a thickness of the seal-engaging plates 46. In a particular embodiment, the seal-engaging plates 46 each have a thickness of 0.5 times that of the intermediate member 40; other relative dimensions may alternately be used.

In a particular embodiment, the engine casing 10 allows for replacement of the seal-engaging plates 20, 46 without replacing the entire end-casing section 12 or the entire central-casing section 14, for example in case of damage to the sliding surfaces 24, 50.

As shown in FIG. 5, fasteners such as circumferentially spaced bolts 60 (only one of which is shown) interconnect the sections to form the engine casing 10.

In a particular embodiment, the fluid cavities 26, 52 of the engine casing 10 are created by forming the fluid cavities on the mating surfaces of the engine casing sections. Advantageously, more economical techniques may become available, such as machining.

In a particular embodiment, manufacturing of the rotary engine casing 10 includes manufacturing a member having a first mating surface such as end-casing member 16 and/or intermediate member 40, and a seal-engaging plate having a second mating surface such as seal-engaging plate 20 and/or intermediate seal-engaging plate 46. The surface depression(s) can then be machined on at least one of the mating surfaces to form the fluid cavity. In a particular embodiment, the method includes forming corresponding depressions on both mating surfaces to form the fluid cavity. Once the depressions are formed the member is assembled with the seal-engaging plate such that the surface depression defines a fluid cavity in communication with the fluid path for circulating a cooling fluid therein. The member and the seal-engaging plate are connected through abutment of the first and second mating surfaces. In a particular embodiment, this includes dowelling and/or bolting the member with the seal-engaging plate in a semi-permanent sub-assembly.

In a particular embodiment, the end-casing members 16, seal-engaging plates 20, rotor housings 30, seal-engaging plates 20 and 46 intermediate member(s) 40 are made of a same material; alternately, different materials may be used.

In a particular embodiment, the split casing sections allow to ease the engine casing 10 assembly process. In such an embodiment, it is simpler and more economical to form the fluid cavities as compared to other manufacturing techniques, such as casting.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of manufacturing a rotary engine casing, the method comprising:
   manufacturing two end-casing sections including a first part of a fluid path for circulating a cooling fluid;
   manufacturing a central-casing section defining at least one internal cavity for receiving a rotor and a second part of the fluid path;
   wherein at least one of the manufacturing of the two end-casing sections and of the manufacturing of the central-casing section includes:
      manufacturing a member having a first mating surface,
      manufacturing a seal-engaging plate having a second mating surface, wherein the seal-engaging plate is manufactured with a thickness less than that of the member, and
      machining at least one surface depression on at least one of the first and second mating surfaces, the at least one surface depression in fluid communication with the fluid path; and
   assembling the central-casing section between the two end-casing sections, including connecting the first and second parts of the fluid path, and assembling the member with the seal-engaging plate by abutting the first and second mating surfaces such that the at least one surface depression defines a fluid cavity in communication with the fluid path for circulating a cooling fluid therein.

2. The method as defined in claim 1, wherein machining the at least one surface depression on at least one of the first and second mating surfaces includes machining complementary depressions on the first and second mating surfaces.

3. The method as defined in claim 1, wherein manufacturing of the two end-casing sections and the manufacturing of the central-casing section both include manufacturing the member, manufacturing the seal-engaging plate and machining the at least one surface depression.

4. A method of manufacturing a rotary engine casing, the method comprising:
   manufacturing two end-casing sections;
   manufacturing a central-casing section defining at least one internal cavity for receiving a rotor;
   wherein at least one of the manufacturing of the two end-casing sections and of the manufacturing of the central-casing section includes:
      machining at least one surface depression in a mating surface of at least one of the seal-engaging plate, an end-casing member and an intermediate member; and
      assembling the seal-engaging plate to the end-casing member or the intermediate member, the end-casing member or the intermediate member being thicker than the seal-engaging plate, the seal-engaging plate and the end-casing member or the intermediate member defining therebetween a fluid cavity; and
   assembling the central-casing section between the two end-casing sections.

5. The method of claim 4, comprising connecting the fluid cavity with a cooling fluid path.

6. The method of claim 4, wherein machining the at least one surface depression includes machining a first depression and a second depression, the first depression and the second depression being complementary to one another, and wherein the first depression and the second depression are respectively defined in first and second mating surfaces.

* * * * *